(12) United States Patent  (10) Patent No.: US 9,975,538 B2
Aardema  (45) Date of Patent: May 22, 2018

(54) MILLING MACHINE FUEL EFFICIENCY CONTROL SYSTEM

(71) Applicant: CATERPILLAR PAVING PRODUCTS INC., Brooklyn Park, MN (US)

(72) Inventor: James A. Aardema, Plymouth, MN (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 252 days.

(21) Appl. No.: 14/715,204

(22) Filed: May 18, 2015

(65) Prior Publication Data
US 2016/0339917 A1  Nov. 24, 2016

(51) Int. Cl.
| | |
|---|---|
| *B60W 10/103* | (2012.01) |
| *B60W 10/06* | (2006.01) |
| *B60W 10/115* | (2012.01) |
| *B60W 30/188* | (2012.01) |
| *F16H 47/04* | (2006.01) |
| *F16H 37/08* | (2006.01) |

(52) U.S. Cl.
CPC .......... *B60W 10/103* (2013.01); *B60W 10/06* (2013.01); *B60W 10/115* (2013.01); *B60W 30/1882* (2013.01); *B60W 2710/0644* (2013.01); *B60W 2710/1005* (2013.01); *B60W 2710/1038* (2013.01); *F16H 47/04* (2013.01); *F16H 2037/088* (2013.01); *Y02T 10/56* (2013.01); *Y02T 10/84* (2013.01)

(58) Field of Classification Search
CPC ............. B60W 10/103; B60W 30/188; B60W 10/115; B60W 10/06; B60W 2510/0638; B60W 2710/1038; B60W 2710/1005; B60W 2710/0644; B60W 10/02; F16H 2037/088; F16H 47/04
See application file for complete search history.

(56) References Cited

U.S. PATENT DOCUMENTS

| | | | | |
|---|---|---|---|---|
| 6,921,230 | B2 * | 7/2005 | Silay | E01C 23/088 299/1.5 |
| 7,434,889 | B2 * | 10/2008 | Moller | B23D 59/001 299/1.5 |
| 8,408,838 | B2 * | 4/2013 | Willis | E01C 23/088 299/1.5 |
| 8,465,105 | B2 | 6/2013 | Parker | |
| 8,622,871 | B2 | 1/2014 | Hoff | |
| 9,267,446 | B2 * | 2/2016 | Killion | F02D 29/00 |
| 2007/0026910 | A1 * | 2/2007 | Brome | A01D 41/127 460/6 |
| 2007/0150166 | A1 | 6/2007 | Mino et al. | |
| 2008/0173740 | A1 * | 7/2008 | Parker | E01C 23/088 241/33 |
| 2013/0079999 | A1 | 3/2013 | Killion et al. | |
| 2014/0155212 | A1 * | 6/2014 | Kato | F16H 47/04 475/59 |

* cited by examiner

*Primary Examiner* — David J Hlavka
(74) *Attorney, Agent, or Firm* — Miller, Matthias & Hull (57) ABSTRACT

A controller-implemented method of controlling a machine having a rotor coupled to an engine through a variable transmission is provided. The controller-implemented method may include receiving a desired rotor speed, determining an engine load of the engine, adjusting an engine speed of the engine based on the engine load and one or more predefined efficiency points, and adjusting a gear ratio of the variable transmission based on the engine speed and the desired rotor speed.

13 Claims, 4 Drawing Sheets

MILLING MACHINE FUEL EFFICIENCY CONTROL SYSTEM

TECHNICAL FIELD

The present disclosure generally relates to milling machines, and more particularly, to methods and systems for controlling the rotor speeds of cold planers and rotary mixers with optimized performance and fuel efficiency.

BACKGROUND

Industrial machines, such as cold planers, pavement profilers, road milling machines, roadway planers, rotary mixers, and the like, are machines designed for scarifying, removing, mixing or reclaiming material from the surface of bituminous or concrete roadways and similar surfaces. These machines typically have a plurality of tracks or wheels which adjustably support and horizontally transport the machine along the surface of the road to be planed. Such milling machines also have a rotatable cutter or planing rotor that may be mechanically and/or hydraulically driven. Vertical adjustment of a milling machine with respect to the road surface may be provided by hydraulically adjustable rods that support the machine above its tracks or wheels.

The rotational speed of the cutter or rotor, or the rotor speed, of a conventional milling machine may be manually or automatically varied and adjusted by the operator. Typically, it may be desirable to maintain substantially constant rotor speed at the speed specified by the operator for at least the duration of a given milling task and/or until the operator chooses otherwise. However, changes in engine speed and engine load throughout the operation can cause unwanted variations in the rotor speed. Some milling machines, such as in U.S. Pat. No. 8,645,105 ("Parker"), provide variable transmissions which allow for variations in the engine speed without affecting rotor speed. However, these conventional systems do not further address fuel efficiency, which is another concern that can be adversely affected by variations in engine speed and engine load.

Accordingly, there is a need for improved solutions for controlling and maintaining a desired rotor speed of a milling machine, which also takes fuel consumption or efficiency into consideration. The present disclosure is directed at addressing one or more of this need. However, it should be appreciated that the solution of any particular problem is not a limitation on the scope of this disclosure or of the attached claims except to the extent express noted.

SUMMARY OF THE DISCLOSURE

In one aspect of the present disclosure, a controller-implemented method of controlling a machine having a rotor coupled to an engine through a variable transmission is provided. The controller-implemented method may include receiving a desired rotor speed, determining an engine load of the engine, adjusting an engine speed of the engine based on the engine load and one or more predefined efficiency points, and adjusting a gear ratio of the variable transmission based on the engine speed and the desired rotor speed.

In another aspect of the present disclosure, a control system for controlling a machine having a rotor coupled to an engine through a variable transmission is provided. The control system may include a memory configured to retrievably store one or more algorithms, and a controller in communication with the memory. Based on the one or more algorithms, the controller may be configured to at least receive a desired rotor speed, determine an engine load of the engine, adjust an engine speed of the engine based on the engine load and one or more predefined efficiency points, and adjust a gear ratio of the variable transmission based on the engine speed and the desired rotor speed.

In yet another aspect of the present disclosure, a machine having an engine, a variable transmission, a rotor and a controller is provided. Furthermore, the variable transmission may be operatively coupled to an output of the engine, the rotor may be operatively coupled to an output of the variable transmission, and the controller may be in electrical communication with one or more of the engine, variable transmission, and the rotor. The controller may be configured to determine an engine load, adjust an engine speed based on the engine load and one or more predefined efficiency points, and adjust a gear ratio of the variable transmission based on the engine speed to maintain a desired rotor speed.

DETAILED DESCRIPTION

Figure 1:
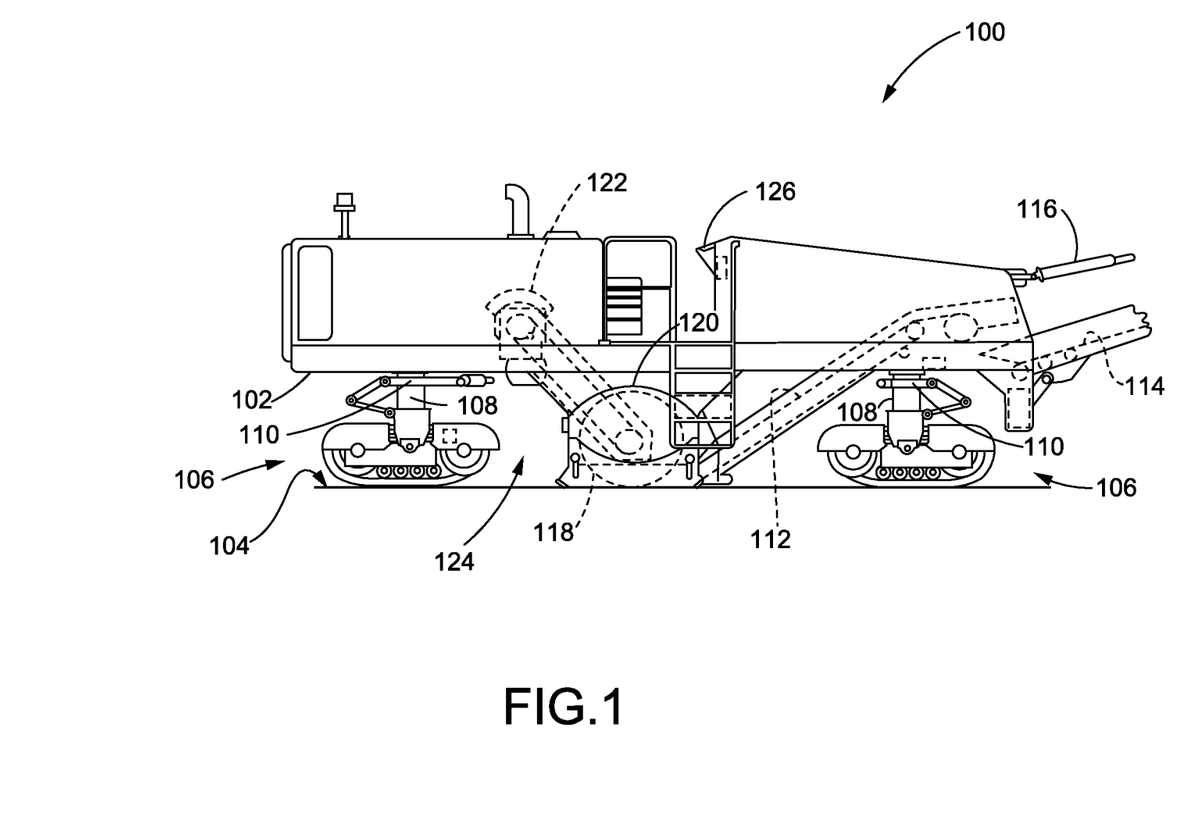
FIG. 1 is a side view of one exemplary milling machine in accordance with the present disclosure.

Referring now to FIG. 1, one exemplary embodiment of a milling machine 100 is provided. Although shown as a cold planer, it will be understood that the milling machine 100 can alternatively include pavement profilers, road milling machines, roadway planers, rotary mixers, or any other suitable machine having a cutter or planing rotor and adapted to scarify, remove, mix or reclaim material from the surface of bituminous or concrete roadways and similar surfaces. As shown, the milling machine 100 may include a frame 102 that is carried along a road surface 104 by an arrangement of track assemblies 106. The frame 102 may be supported on the track assemblies 106 by hydraulically actuated adjustable struts 108 that extend between the track assemblies 106 and the frame 102. Hydraulic cylinders 110 may also be provided and used to raise and lower the milling machine 100. The milling machine 100 may also include a pickup conveyor belt 112 which delivers debris to a discharge conveyor belt 114 that is movably supported by a telescoping arm 116.

The milling machine 100 in FIG. 1 may further include a rotor 118 that is rotatably mounted to the frame 102, and a housing 120 that is disposed about the body of the rotor 118 but exposed to the road surface 104. The depth of the cut made by the rotor 118 may be controlled by the appropriate extension or refraction of the adjustable struts 108 and cylinders 110. The milling machine 100 may also include an engine 122 as a power source that may drive the rotor 118 via a hydrostatic, mechanical, or hydromechanical drive arrangement, such as a continuously variable transmission (CVT) 124, or the like. The engine 122 may be a combustion engine, such as a diesel engine, a gasoline engine, a natural gas engine, or the like. Furthermore, drive arrangements or configurations other than that shown in FIG. 1 can be employed. The milling machine 100 may further include an operator interface 126 which provides input and output devices enabling operator control of one or more of the engine 122, the CVT 124, the rotor 118, and the like.

Figure 2:
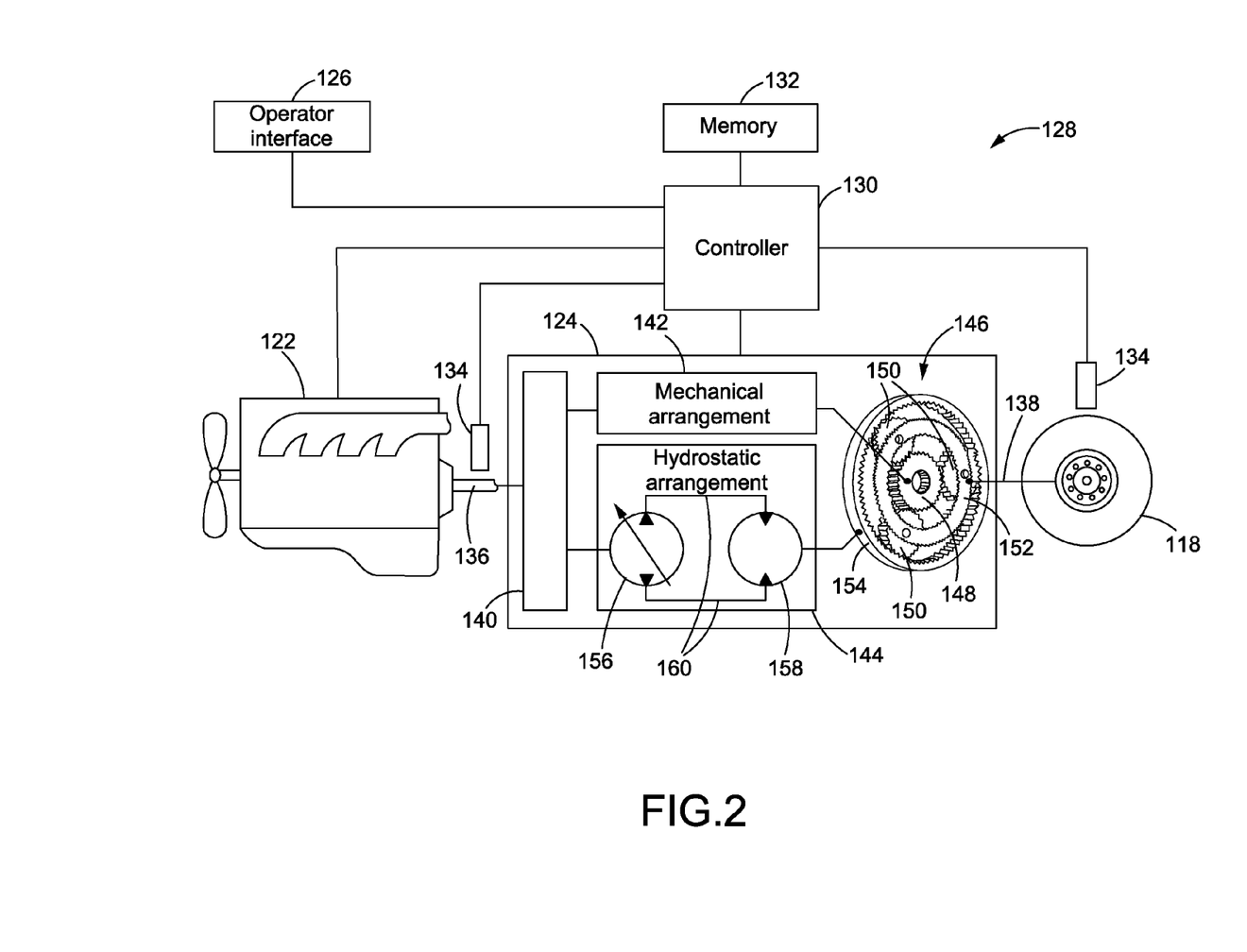
FIG. 2 is a diagrammatic view of one exemplary control system of the present disclosure.

Turning to FIG. 2, one exemplary embodiment of a control system 128 is provided which may be integrated into the milling machine 100 and used to control at least the rotor 118 in response to input received via the operator interface 126. As shown, the control system 128 may include a controller 130 that is in electrical communication with at least a memory 132, the operator interface 126, and one or more of the rotor 118, the engine 122, and the CVT 124. The controller 130 may further communicate with one or more sensors 134, such as encoders, Hall-effect sensors, variable reluctance sensors, anisotropic magnetoresistance sensors, or any other means for determining at least engine speed via an engine output 136 and rotor speed via a CVT output 138. The controller 130 may be implemented using one or more of a processor, a microprocessor, a microcontroller, an electronic control module (ECM), an electronic control unit (ECU), and any other suitable means for receiving input from the operator interface 126 and directly or indirectly providing control of the milling machine 100. Furthermore, the controller 130 may be configured to operate according to predetermined algorithms or sets of instructions retrievably stored within the associated memory 132.

As also shown in FIG. 2, the CVT 124 may further include a clutch 140, a mechanical arrangement 142, a hydrostatic arrangement 144, as well as a planetary gear set 146 having a sun gear 148, planetary gears 150, a carrier 152 and a ring gear 154. In the embodiment shown, the clutch 140 may selectively couple the engine output 136 to one or more of the mechanical arrangement 142 and the hydrostatic arrangement 144. The mechanical arrangement 142 may include any suitable arrangement of pulleys, belts, roller chains, output shafts, and the like, configured to mechanically couple the engine output 136 to the sun gear 148. The hydrostatic arrangement 144 may include, for example, a hydraulic pump 156, a hydraulic motor 158, and corresponding fluid lines 160 collectively configured to hydromechanically couple the engine output 136 to the ring gear 154. More specifically, the engine output 136 may mechanically drive the hydraulic pump 156 to pressurize fluid within the fluid lines 160, and thereby cause the hydraulic motor 158 to mechanically drive the ring gear 154. The corresponding rotations of the carrier 152 may be directly communicated to the rotor 118 via the CVT output 138.

Figure 3:
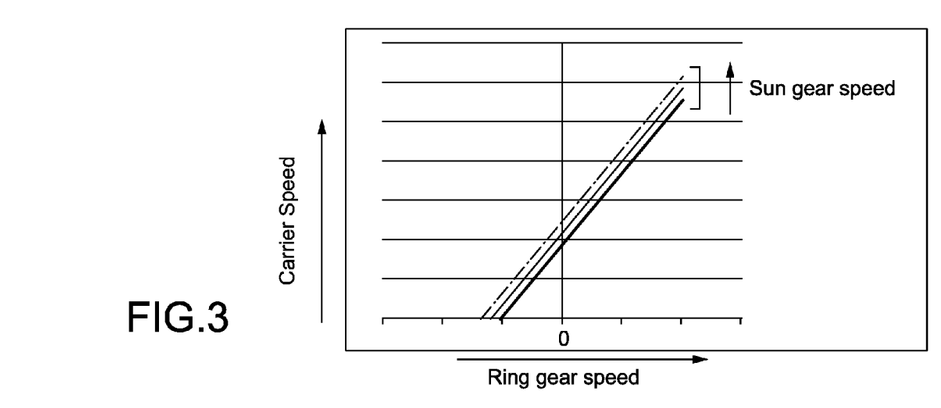
FIG. 3 is a graphical illustration of the relationships between the carrier speed, the ring gear speed and the sun gear speed of a planetary gear set that may be referenced by the present disclosure.

With further reference to FIG. 3, the CVT 124 and the planetary gear set 146 of FIG. 2 may be operated to continuously adjust the gear ratio, for instance, between the engine output 136 and the CVT output 138, in a manner which substantially maintains the rotor speed at the desired rotor speed specified by the operator irrespective of changes in the engine speed. As illustrated in FIG. 3, for example, any suitable rotor speed can be achieved and maintained at the carrier 152 by manipulation of the speed of the sun gear 148 and/or the speed of the ring gear 154, where the sun gear 148 is driven by the engine 122 and the ring gear 154 is driven by the hydraulic motor 158. Although shown in graphical form, relationships between the sun gear 148, carrier 152 and the ring gear 154 may be predetermined and preprogrammed within the memory 132 associated with the controller 130, such as in the form of lookup tables, maps, mathematical formulations, or any other suitable format that enables the controller 130 to automatically adjust one or more of the engine 122 and the hydraulic motor 158 to output a desired rotor speed.

Figure 4:
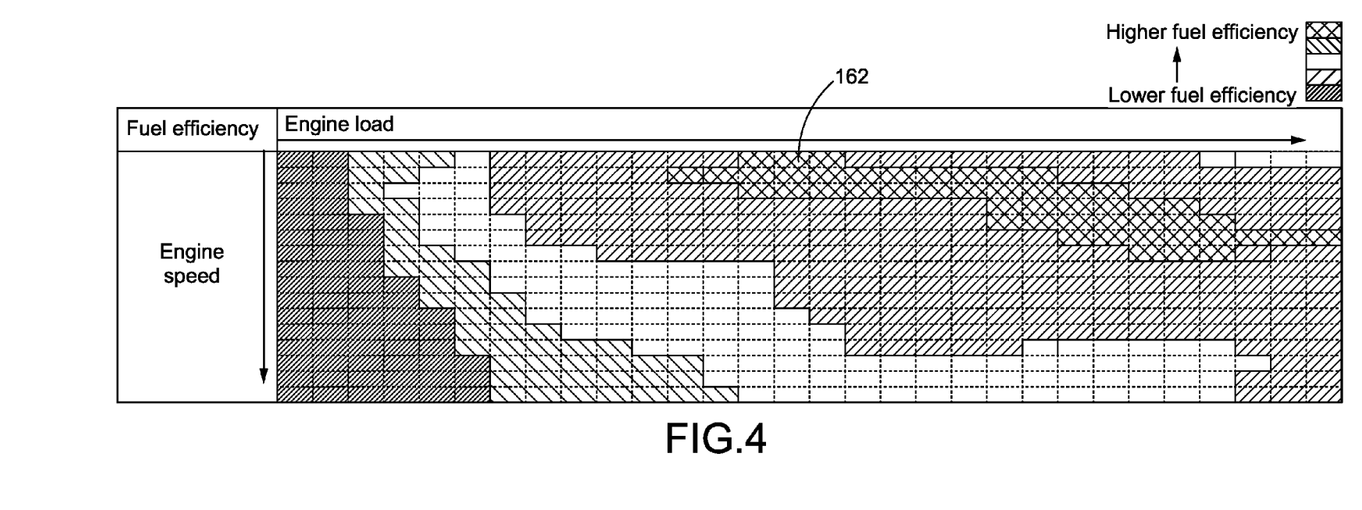
FIG. 4 is a tabular illustration of fuel consumption rates and the associated efficiency points that may be referenced by the present disclosure.

In addition to providing a desired rotor speed, the gear ratio between the engine output 136 and the CVT output 138 may further be continuously adjusted in a manner that provides optimum fuel efficiency, or constrained according to predetermined fuel consumption rates shown in FIG. 4. More specifically, the estimated fuel consumption rates for a given milling machine 100 and an associated engine 122 may be predetermined for different combinations of engine speed and engine load, where the engine load may include loads due to the rotor 118, the hydrostatic arrangement 144, and other parasitic loads. As graphically represented in FIG. 4, the relative fuel consumption rates may be used to predefine efficiency points 162, or combinations of engine speed and engine load expected to provide relatively better fuel economy. Information pertaining to these relationships between fuel consumption rate, engine speed and engine load, or at least the efficiency points 162 associated therewith, may be preprogrammed within the memory 132 and available to the controller 130, such as in the form of lookup tables, maps, mathematical formulations, or the like. Moreover, using the efficiency points 162 as reference, the controller 130 may be able to control the engine 122 to output an engine speed that is not only appropriate for the determined engine load, but also the fuel efficient.

Using a combination of such techniques, the controller 130 of the control system 128 of FIG. 2 may be capable of achieving and maintaining a desired rotor speed while optimizing fuel efficiency. Specifically, the controller 130 communicates with the engine 122 to adjust engine speed based on changes in the engine load and predefined efficiency points 162 for better fuel economy. The controller 130 further communicates with the CVT 124 to adjust the gear ratio based on changes in the engine speed for more consistent rotor speeds. Moreover, the controller 130 of FIG. 2 may be configured to control rotor speeds and optimize fuel efficiency based on algorithms or sets of instructions programmed therein and/or retrievably stored within the memory 132. While other variations and modifications will be apparent to those of ordinary skill in the art, one exemplary algorithm or method by which the controller 130 may be operated is discussed in more detail below.

INDUSTRIAL APPLICABILITY

In general, the present disclosure finds utility in various industrial applications involving the use of machines, such as cold planers, pavement profilers, road milling machines, roadway planers, rotary mixers, or other machines designed for scarifying, removing, mixing or reclaiming material from the surface of bituminous or concrete roadways and similar surfaces. In particular, by providing a milling machine with a cutter or rotor that is driven via a variable transmission with continuously adjustable gear ratios, the present disclosure is able to dynamically control the rotor and more reliably maintain desired rotor speeds specified by the operator. Furthermore, by constraining adjustments to the gear ratios based on predetermined fuel consumption rates and predefined efficiency points, the present disclosure is also able to dynamically control the engine to operate with better fuel economy.

Figure 5:
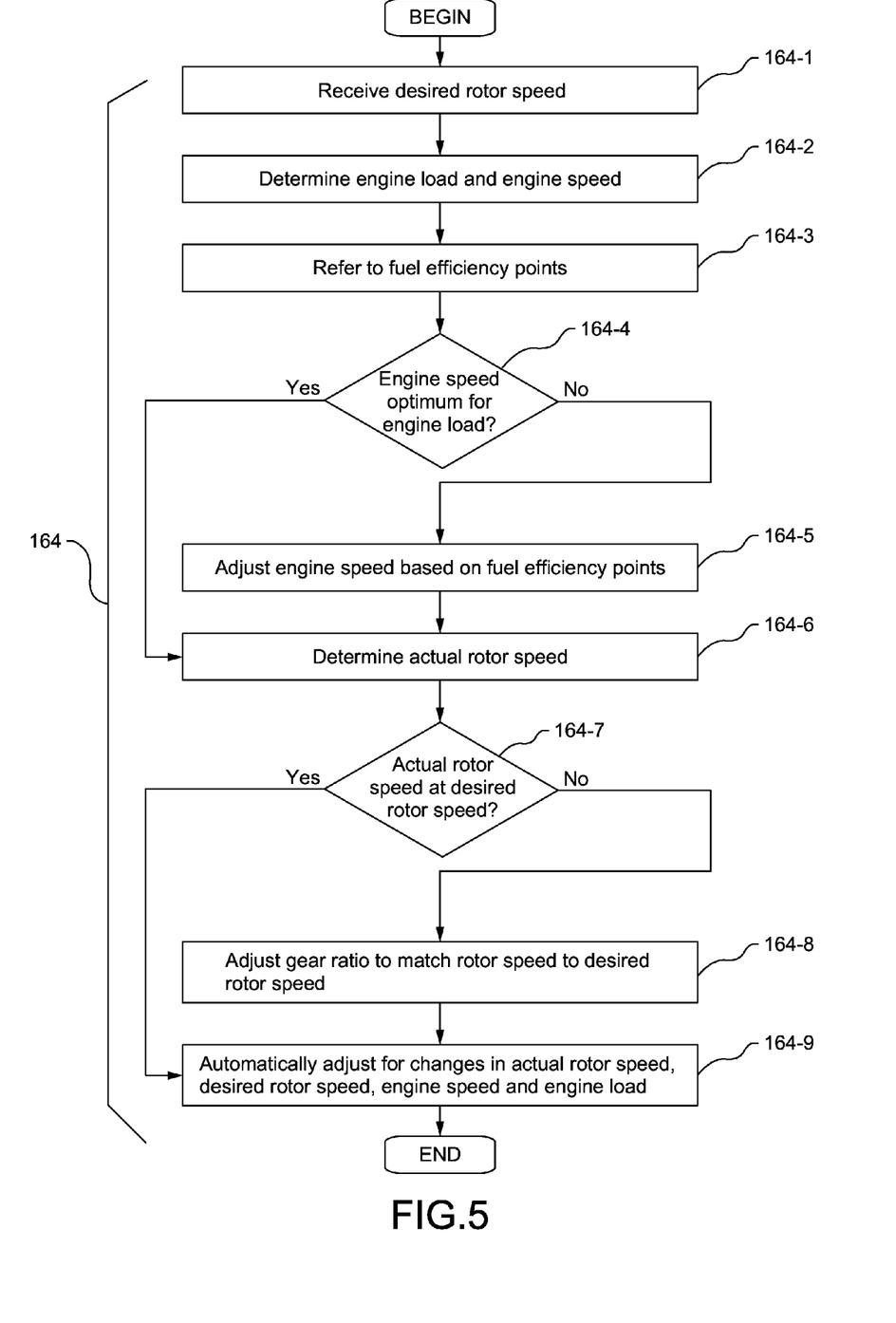
FIG. 5 is a flow diagram of one exemplary method for controlling a milling machine of the present disclosure.

Turning to FIG. 5, one exemplary algorithm or controller-implemented method 164 of controlling a milling machine 100 having a rotor 118 coupled to an engine 122 through a CVT 124 is diagrammatically provided. As shown in block 164-1, the controller 130 may initially receive a desired rotor speed from the operator, such as via the operator interface 126 of the milling machine 100. In block 164-2, the controller 130 may additionally monitor or determine the current engine speed and current engine load of the milling machine 100, such as via a sensor 134 located at the engine output 136. Additionally, in block 164-3, the controller 130 may retrieve, recall and/or refer to predefined fuel efficiency points 162, or any other predetermined information pertaining to the fuel consumption characteristics of the milling machine 100 stored in memory 132, to determine an optimum engine speed for the given engine load. Once the optimum engine speed, or the engine speed expected to provide the optimum fuel efficiency, has been determined for the given engine load, the controller 130 in block 164-4 may compare the actual engine speed to the optimum engine speed.

If the actual engine speed is not at the optimum engine speed as derived from the predefined fuel efficiency points 162 in block 164-4 of FIG. 5, the controller 130 may increase or decrease the engine speed in block 164-5 until the optimum engine speed is substantially achieved. Once the engine speed has been determined to be at the optimum engine speed, the controller 130 may proceed to block 164-6 to determine the actual speed of the rotor 118, such as via a sensor located at the CVT output 138. If, however, the controller 130 in block 164-4 determines the actual engine speed to be already at the optimum engine speed, the controller 130 may proceed to block 164-6 as shown without adjusting engine speed. Furthermore, once the actual rotor speed has been determined in block 164-6, the controller 130 in block 164-7 may compare the actual rotor speed to the desired rotor speed specified by the operator to determine if any adjustments need to be made in the gear ratio of the CVT 124.

If the actual rotor speed is not in substantial agreement with the desired rotor speed in block 164-7, the controller 130 may proceed to block 164-8 to adjust the gear ratio of the CVT 124 accordingly. For example, the controller 130 may derive the current speed of the sun gear 148 of the CVT 124 based on the optimum engine speed determined in blocks 164-4 and 164-5, and further, derive the target speed of the carrier 152 based on the desired rotor speed received in block 164-1. The controller 130 may then apply the sun gear speed and the carrier speed to predetermined relationships of the planetary gear set 146 of the CVT 124, as graphically illustrated in FIG. 3 for example, to derive the target speed of the ring gear 154. The controller 130 may further control the speed of the ring gear 154 via the hydraulic motor 158 of the CVT 124 until the target ring gear speed, and thereby the corresponding target carrier speed and desired rotor speed, is achieved. If, however, the actual rotor speed is determined to be already at the desired rotor speed in block 164-7, the controller 130 may proceed to block 164-9 to monitor for any changes necessitating further gear ratio adjustments.

Once the desired rotor speed has been achieved for a given iteration of the method 164, the controller 130 may proceed to block 164-9 of FIG. 5 to continue making any necessary adjustments to the gear ratio of the CVT 124. Adjustments to the gear ratio may be intended to not only substantially maintain the rotor 118 at the desired rotor speed, but also to maintain the optimum engine speed for the given engine load. For example, the controller 130 may continue monitoring for significant changes in one or more of the actual rotor speed, the desired rotor speed, the engine speed and the engine load, and if substantial changes are detected, repeat any one or more of the functions or blocks of FIG. 5 as necessary. Iterations of the method 164 of FIG. 5 may be repeated in such manner as needed, or for example, for as long as the rotor 118 is in use and for as long as a desired rotor speed has been received by the operator interface 126. Furthermore, it will be understood that any two or more functions or blocks of the method 164 of FIG. 5 may be performed simultaneously or in sequences other than as shown to provide comparable results.

From the foregoing, it will be appreciated that while only certain embodiments have been set forth for the purposes of illustration, alternatives and modifications will be apparent from the above description to those skilled in the art. These and other alternatives are considered equivalents and within the spirit and scope of this disclosure and the appended claims.

What is claimed is:

1. A controller-implemented method of controlling a machine having a rotor coupled to an engine through a variable transmission, comprising:
   receiving a desired rotor speed;
   determining an engine load of the engine;
   adjusting an engine speed of the engine based on the engine load and one or more predefined efficiency points at least partially based on predetermined fuel consumption rates and providing optimum engine speeds for different engine loads; and
   adjusting a gear ratio of the variable transmission based on the engine speed and the desired rotor speed.

2. The controller-implemented method of claim 1, wherein the desired rotor speed is received through an operator interface of the machine.

3. The controller-implemented method of claim 1, wherein the engine load includes loads due to at least the rotor and a hydrostatic arrangement.

4. The controller-implemented method of claim 1, wherein the engine speed is automatically adjusted based on detected changes in the engine load according to one or more predetermined relationships providing a plurality of the predefined efficiency points.

5. The controller-implemented method of claim 1, wherein the gear ratio of the variable transmission is automatically adjusted to maintain a rotor speed of the rotor at the desired rotor speed irrespective of changes in the engine speed.

6. A machine, comprising:
   an engine;
   a variable transmission operatively coupled to an output of the engine;
   a rotor operatively coupled to an output of the variable transmission; and
   a controller in electrical communication with one or more of the engine, variable transmission, and the rotor, the controller being configured to determine an engine load, adjust an engine speed based on the engine load and one or more predefined efficiency points being based at least partially on predetermined fuel consumption rates and providing optimum engine speeds for different engine loads, and adjust a gear ratio of the variable transmission based on the engine speed to maintain a desired rotor speed.

7. The machine of claim 6, wherein the variable transmission includes a gear set and a hydraulic motor configured to adjust a rotor speed of the rotor.

8. The machine of claim 7, wherein the gear set is a planetary gear set having a sun gear coupled to the engine, a carrier coupled to the rotor, and a ring gear coupled to the hydraulic motor.

9. The machine of claim 7, wherein the controller is configured to adjust the gear ratio through control of the hydraulic motor.

10. The machine of claim 6, wherein the controller is configured to determine the engine load as a sum of loads due to at least the rotor and a hydrostatic arrangement.

11. The machine of claim 6, wherein the controller is configured to automatically adjust the engine speed based on changes in the engine load according to one or more predetermined relationships providing a plurality of the predefined efficiency points.

12. The machine of claim 6, further comprising an operator interface configured to at least receive the desired rotor speed from an operator of the machine, the controller being configured to receive the desired rotor speed from the operator interface.

13. The machine of claim 6, further comprising a clutch disposed between the engine and the rotor, the controller being configured to selectively disengage the rotor from the engine through control of the clutch.

\* \* \* \* \*

(12) INTER PARTES REVIEW CERTIFICATE (3832nd)
United States Patent (10) Number: US 9,975,538 K1
Aardema (45) Certificate Issued: Dec. 20, 2024

(54) MILLING MACHINE FUEL EFFICIENCY CONTROL SYSTEM (71) Applicant: James A. Aardema

(72) Inventor: James A. Aardema

(73) Assignee: CARTERPILLAR INC.

Trial Number:

IPR2022-01397 filed Aug. 10, 2022

Inter Partes Review Certificate for:

Patent No.: 9,975,538
Issued: May 22, 2018
Appl. No.: 14/715,204
Filed: May 18, 2015

The results of IPR2022-01397 are reflected in this inter partes review certificate under 35 U.S.C. 318(b).

INTER PARTES REVIEW CERTIFICATE
U.S. Patent 9,975,538 K1
Trial No. IPR2022-01397
Certificate Issued Dec. 20, 2024

AS A RESULT OF THE INTER PARTES REVIEW PROCEEDING, IT HAS BEEN DETERMINED THAT:

Claim 13 is found patentable.

Claims 1-12 are cancelled.

\* \* \* \* \*